United States Patent
Gutmann et al.

[11] Patent Number: 6,044,951
[45] Date of Patent: Apr. 4, 2000

[54] CLAW TOOTHING FOR A GEARBOX OR THE LIKE

[75] Inventors: Peter Gutmann; Georg Tauschek, both of Munich, Germany

[73] Assignee: BLW Praezisionsschmiede GmbH, Munich, Germany

[21] Appl. No.: 09/217,013

[22] Filed: Dec. 21, 1998

Related U.S. Application Data

[63] Continuation of application No. PCT/EP97/03174, Jun. 18, 1997.

[30] Foreign Application Priority Data

Jun. 21, 1996 [DE] Germany .................. 196 24 772

[51] Int. Cl.$^7$ .................................................. F16D 11/14
[52] U.S. Cl. .......................................... 192/108; 192/114 T
[58] Field of Search .................... 192/108, 114 T

[56] References Cited

U.S. PATENT DOCUMENTS

| | | |
|---|---|---|
| 600,994 | 3/1898 | See . |
| 1,543,608 | 6/1925 | Leidecker . |
| 1,597,198 | 8/1926 | Howell . |
| 1,866,315 | 7/1932 | Merrill . |
| 2,049,127 | 7/1936 | Maybach .............. 192/108 X |
| 2,843,927 | 7/1958 | Stock . |
| 3,550,738 | 12/1970 | Halibrand . |
| 3,739,664 | 6/1973 | Swanstrom, Jr. . |
| 3,780,840 | 12/1973 | Thomas . |
| 5,524,738 | 6/1996 | Erlebach et al. . |
| 5,870,923 | 2/1999 | Eisen et al. . |

FOREIGN PATENT DOCUMENTS

| | | |
|---|---|---|
| 0073985 | 3/1983 | European Pat. Off. . |
| 356109 | 2/1920 | Germany . |
| 599714 | 6/1934 | Germany . |
| 2052244 | 5/1971 | Germany . |
| 28 55 712 | 4/1980 | Germany . |
| 19514349 | 12/1995 | Germany . |
| 59-73627 | 4/1984 | Japan . |
| 347390 | 6/1960 | Switzerland . |
| 26538 | of 1913 | United Kingdom . |
| 1039905 | 6/1963 | United Kingdom . |
| 1542981 | 3/1979 | United Kingdom . |
| 2081822 | 2/1982 | United Kingdom . |
| 2106435 | 4/1983 | United Kingdom . |

*Primary Examiner*—Allan D. Herrmann
*Attorney, Agent, or Firm*—Helgott & Karas, P.C.

[57] ABSTRACT

In the case of a claw toothing for a gearbox or the like, of which the claws are designed with an undercut and, viewed in cross-section with respect to the longitudinal axis of the claws, have a flat or convex roof profile, it is provided to improve the engagement that the plan view of the claws tapers into a wedge shape towards the rotational axis of the claw toothing and that the generatrices (5a, 5b) of the roof profile and/or the sides, in the longitudinal direction of the claw, are straight lines which go through the rotational axis (D).

8 Claims, 4 Drawing Sheets

6,044,951

CLAW TOOTHING FOR A GEARBOX OR THE LIKE

This Appln is a con't of PCT/EP97/03174 filed Jun. 18, 1997.

BACKGROUND OF THE INVENTION

The invention relates to claw toothing for a gearbox or the like, of which the claws are designed with an undercut and, viewed in cross-section with respect to the longitudinal axis of the claws, have a flat or convex roof profile.

Such claw toothings, in particular in gear-shift sleeves and gear wheels in motor vehicle gear boxes, are subject to great wear. The roof profile of the claws, which plays an important role for the first contact in the meshing phase, is therefore to be designed in such a way that the engagement occurs quickly and as much as possible without friction. Moreover, the quality of the claw toothing is determined decisively by the design of the sides; by the sides forming an undercut, a reliable engagement is ensured.

From the U.S. Pat. No. 3,550,738 a synchronizing claw clutch coupling is known in which individual claw elements protrude cam contour-shaped. In this way, shifting gear at high speeds becomes possible, without causing edge wear on the claws which occurs with conventional couplings. The known claws have, according to FIGS. 4, 5; 8, 9 and 12, 13 respectively of this U.S. Pat. No. 3,550,738, sides with slight undercuts as well as a flat or convex roof profile, viewed cross-sectionally to the longitudinal axis of the claw. The plan view shape of the claws in this case tapers into a wedge shape towards the axis of rotation of the claw toothing and the generatrices of the claw shape in the longitudinal direction of the claw are straight lines which in the area of the sides run according to this wedge shape.

In addition, a motor vehicle coupling which responds quickly and with low friction is known (U.S. Pat. No. 5,524,738), the claws of which are undercut on both sides; the claws, viewed in cross-section with respect to the longitudinal axis of the claws, have a flat or convex roof profile. Also here, the plan view of the claws tapers into a wedge shape towards the rotational axis of the claw toothing and the generatrices of the claw shape are at least in the area of the sides in the longitudinal direction formed by straight lines which run according to the wedge shape. Hereby, a shifting of gear at high speeds should be possible with little wear.

SUMMARY OF THE INVENTION

The object of the present invention is to improve such a claw toothing in the sense that in achieving a claw shape simple to manufacture, the contact upon engagement is particularly smooth and that the time of engagement, decisive for the transfer of the torque, is achieved early producing a large meshing surface in which case, by and large, the life of the claw toothing should be improved.

With a claw toothing of the type mentioned at the start, this problem is solved in that the plan view of the claws tapers into a wedge shape towards the rotational axis of the claw toothing, that the generatrices of the roof profile and/or the sides, in the longitudinal direction of the claw, are straight lines which go through the rotational axis.

With this claw shape, called "spiral claw" in the following, the generatrices form for the claw contour a spiral surface or a screw surface, that is, the generatrices run in the form of radial straight lines at various heights through the rotational axis and are twisted towards one another, that is, unlike for the known claw shapes, the sides in the case of the spiral claw do not describe a plane surface anymore, but a spiral surface.

Preferably the spiral surface also extends into the area of the roof profile so that, in accordance with the mutual rotation of the two toothing partners in the area of the roof profile, the contact between two claws is reduced to a line, that is, the engagement resistance is particularly low. Similar conditions can be realized for other claw shapes in that the roof profile at right angles to the longitudinal plane of the respective claw is of convex design thus, for example, has a pitch circular, or elliptic, or in a similar manner curved shape.

Such crowned roof profiles and correspondingly spiralled sides for claw toothings can technically be realized by means of special hot and cold calibration forming processes. They are particularly suited for gear boxes in motor vehicles where, besides high durability, the ease of changing gear is of significant importance.

For the operation of the claw toothing according to the invention, it is not necessary that all claws have a particular, for example, plane or convex roof profile. In general, it suffices to provide only part of the claws with a particular roof profile; in this case, it is admittedly necessary that the claws of this part are of a design to an extent higher than the remaining claws. The height of the roof profile can in this case correspond completely or partly to the extent of superelevation.

For example, it suffices if only each second claw in a partner of a claw toothing is provided with a superelevated roof profile. The superelevated claws ensure a reduced contact between the two partners of a claw toothing at the moment of engagement and facilitates thus the changing of gears. The more claws come simultaneously into contact with one another, that is, the more claws have a roof profile improving the engagement, the longer the life of the toothing, accepting admittedly an increasing engagement resistance.

Only when all claws are provided with a particular roof profile is its superelevation of no importance anymore; decisive then is only the design of the claw shape and the roof profile in such a way that the contact surface between the claws coming in contact with one another at the moment of engagement is minimized and that the torsional tendency up to the realization of the torque transferring edge engagement is optimal.

While, in the area of the roof profile, a line contact between the claws coming in contact with one another upon engagement is strived for, only an area contact is more suitably considered for the edge contact of the claws.

The meshing performance is also further improved by designing, in a way known in itself, a surrounding height section, forming the bottom edge of the roof profile, as flattening, also known in the technical language as "flat".

BRIEF DESCRIPTION OF THE SEVERAL VIEWS OF THE DRAWINGS

In the following, the invention is elucidated by means of the drawing.

Here.

DESCRIPTION OF PREFERRED EMBODIMENTS

Figure 1:
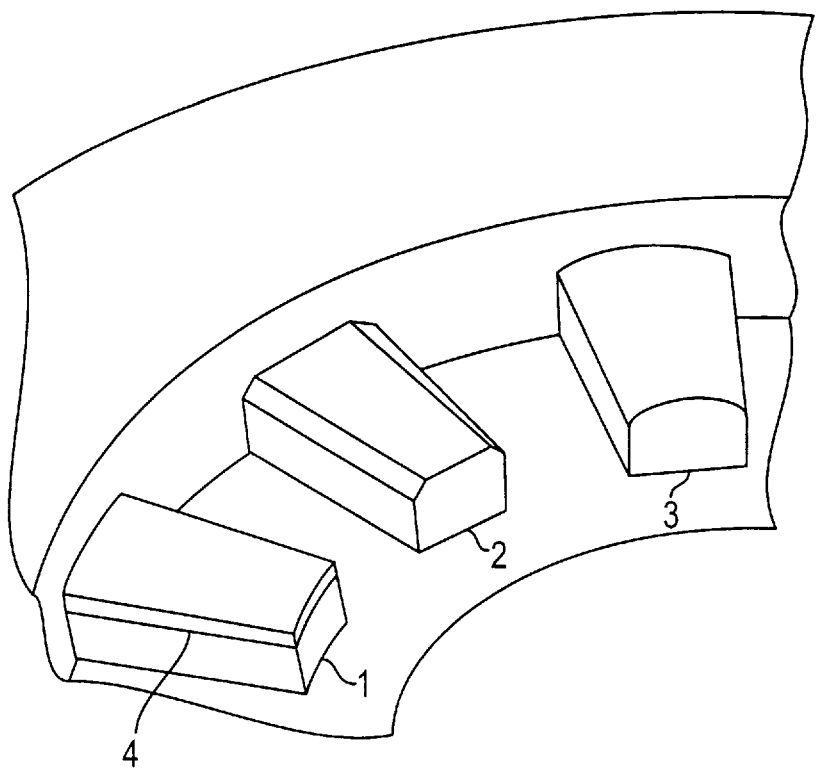
FIG. 1 shows, in perspective representation, a section of a claw toothing with three different claw shapes.

FIG. 1 shows a section from a toothing area of a claw toothing with three different claw shapes, namely a claw 1 with a flat roof profile, a claw 2 with a laterally bevelled, flat roof profile and a claw 3 with a convexly rounded roof profile. The three different claw shapes of a toothing body are merely for the purpose of demonstration since different claw shapes in the same toothing body do not seem useful, at any rate not when, as shown here, the claws are of the same height. Admittedly, a combination would be conceivable of flat claws 1, for example, with a height according to the dotted line 4, and another claw shape, for example, according to the claw 2 with laterally bevelled roof profile or the claw 3 with rounded roof profile in which case each of the roof profiles is superelevated with respect to the flat claw 1. Suitably, such a claw body could alternately have a flat claw without superelevation and a claw with superelevated roof profile.

The different claw shapes according to FIG. 1 are shown relatively inexact, that is, neither the undercutting of the sides can be seen nor is the transition depicted between the actual basic body of the claw and its roof profile.

Figure 2:
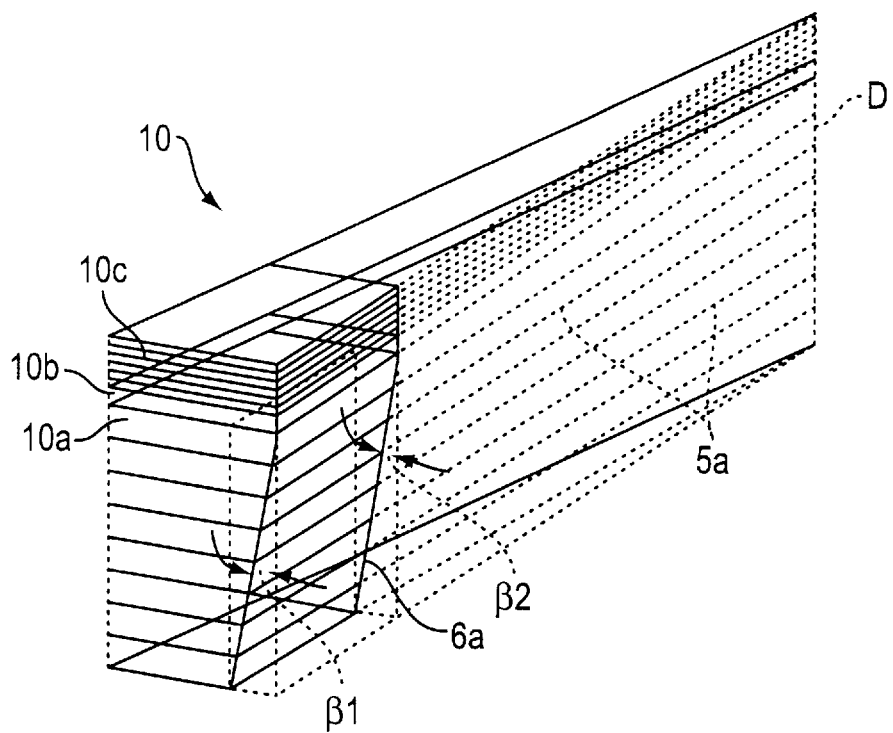
FIG. 2 shows, in half longitudinal section, a spiral claw with flat roof profile and flat.

FIG. 2 describes a so-called spiral claw 10 as half section in the representation. Here, all generatrices of the sides 6a intersect the imaginary axis of rotation D, that is, the generatrices 5a are formed by straight lines which are twisted with respect to the axis of rotation D. This means that the undercutting of the sides 6a, seen in the radial direction to the axis of rotation D, decreases, that is, the angle of undercutting β1 at the front surface of the spiral claw 10 is greater than the angle of undercutting β2 at its rear surface. Viewed on the whole, the side 6a represents a helicoidal surface, the generatrices of which, conforming to the principle of a helicoidal surface, are straight lines through the axis of rotation, of which the angle of twist, related to a certain vertical step, is constant. Consequently, all edges of the spiral claw 10 are defined by straight lines. A claw shape with claw body 10a, flat 10b and flat (rectangular) roof profile 10c were selected.

To elucidate the representation, the generatrices 5a are traced in each case up to the rotational axis D so that one easily can see they run conforming to the principle.

The following FIGS. 3 to 7 have in common that they show a spiral claw 10 each with the same basic body 10a, the same flat 10b, but different roof profiles.

Figure 3:
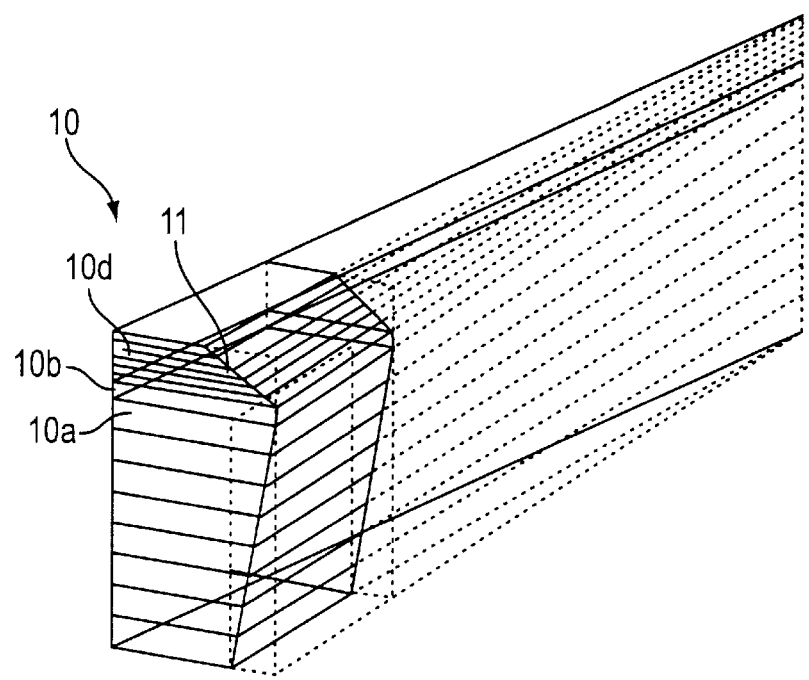
FIG. 3 shows a half section according to FIG. 2 through a spiral claw with laterally sloped roof profile.

FIG. 3 shows a flat roof profile 10d with lateral bevel 11 that in combination provides a polygonal profile.

Figure 4:
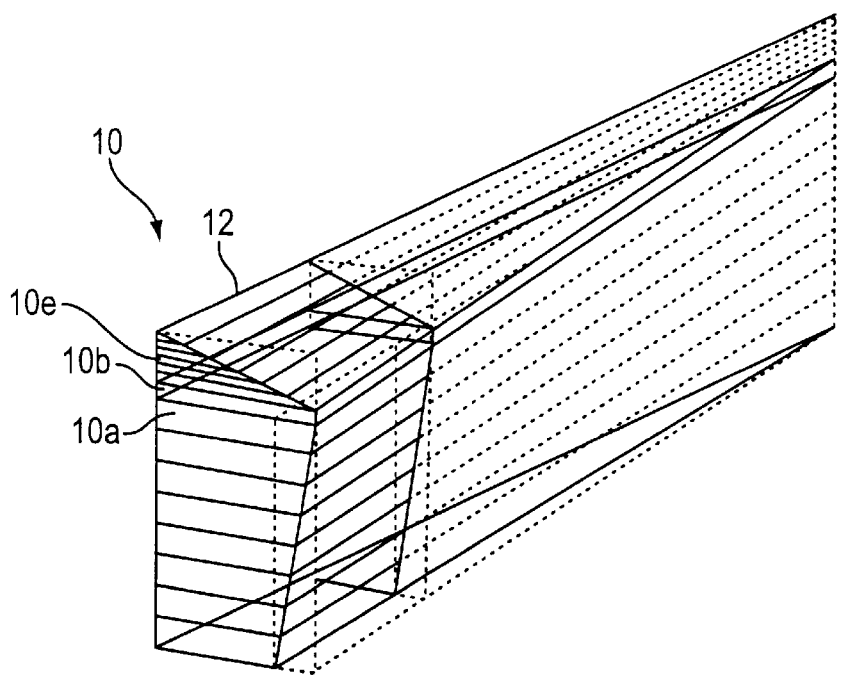
FIG. 4 shows a half section according to FIG. 2 through a spiral claw with gable-shaped roof profile.

FIG. 4 shows a gable-shaped roof profile 10e. The two roof slopes intersect along the line 12 in the longitudinal median plane of the spiral claw 10 to produce a triangular profile. Again, only a half of the spiral claw 10 is shown; to simplify the representation, the other half is omitted.

Such half claw shapes are, of course, perfectly conceivable as valid claw shape, for example, in gears which only are loaded in one direction of rotation.

Figure 5:
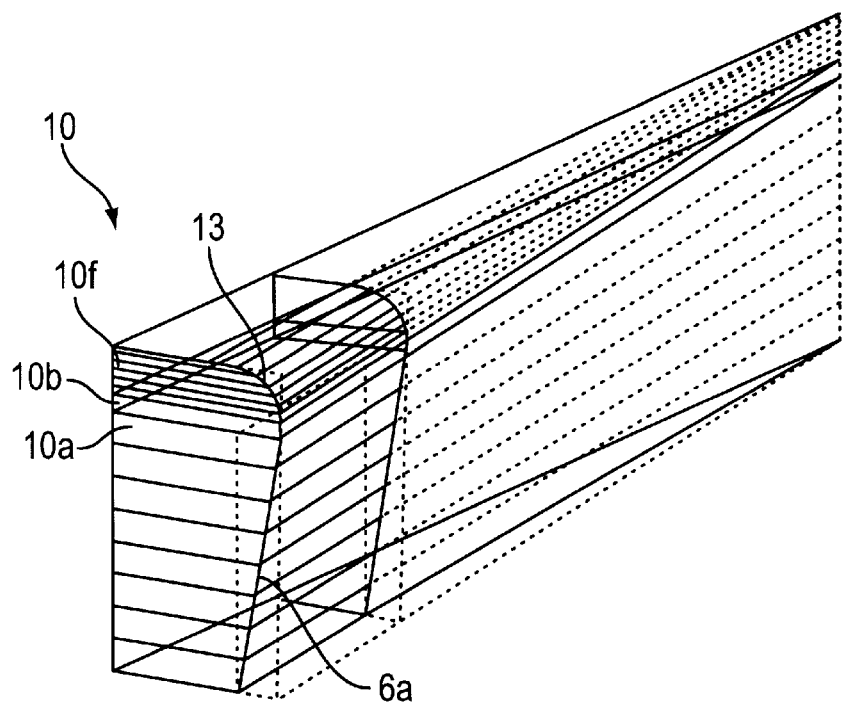
FIG. 5 shows a half section according to FIG. 2 through a spiral claw with laterally rounded roof profile.

According to FIG. 5, the spiral claw 10 has again a flat roof profile 10f which has a rounding 13 towards the side 6.

Figure 6:
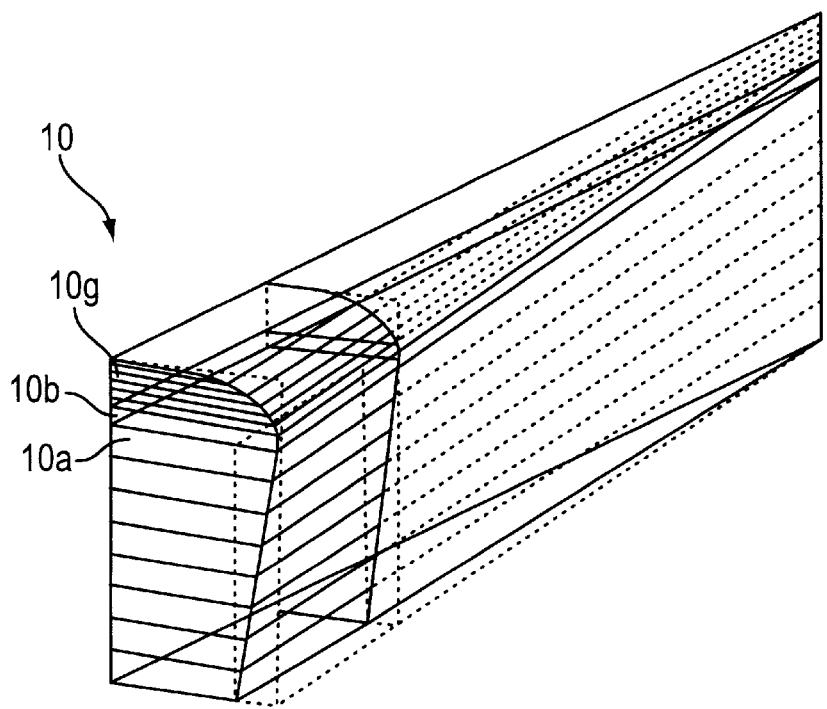
FIG. 6 shows a half section according to FIG. 2 through a spiral claw with oval roof profile.

The spiral claw 10 has, according to FIG. 6, an oval roof profile 10g, superimposed on a flat 10b, the latter superimposed on a basic body 10a, which again is identical to the shape of the basic body according to FIGS. 2 to 6.

Figure 7:
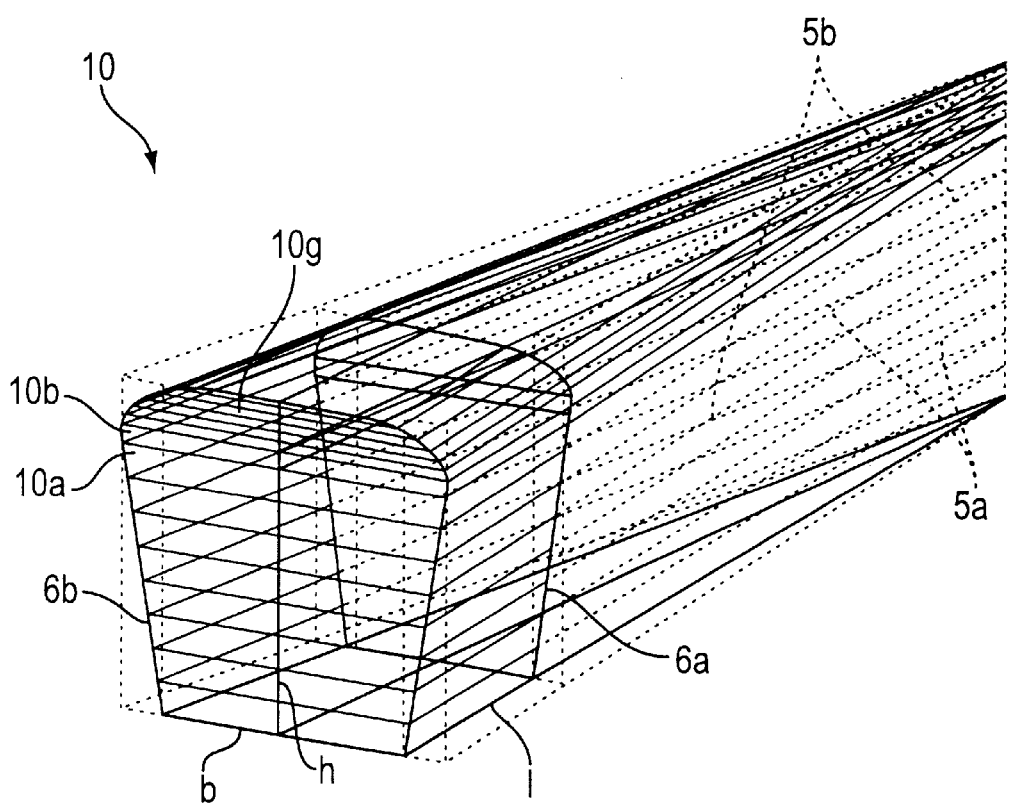
FIG. 7 shows a complete spiral claw according to FIG. 6.

While FIG. 6 again only shows half a spiral claw, intersected in the longitudinal median plane, the same claw is shown but completely according to FIG. 7. Here, both the generatrices 5a of the side 6a and the generatrices 5b of the undercut opposing side 6b are drawn. The convex roof profile 10g is formed by half an oval which particularly can have the shape of half of an ellipse.

With the aid of FIG. 7, which represents a completion, symmetrical to the longitudinal median plane of the half claw according to FIG. 6, one can imagine without any further that the representations in the FIGS. 2 to 5 are to be completed accordingly to a full claw shape. The dimensions of the respective basic bodies with regard to their height h, their width b and their radial length l are determined depending on the claw type and claw shape desired on the finished gear.

What is claimed is:

1. Claw toothing for rotation about an axis and including claws, for example in a gearbox, each claw having an undercut and, in cross-section with respect to a longitudinal axis of the claw, having one of a flat and convex roof profile, in plan view each claw tapers into a wedge shape towards the rotational axis of the claw toothing, a respective generatrix of at least one of the roof profile and claw sides, in the longitudinal direction of the claw, is a straight line extending through the rotational axis.

2. Claw toothing according to claim 1, wherein the roof profile depicts one of a triangular and polygonal gable.

3. Claw toothing according to claim 1, wherein the roof profile, viewed at right angles to the longitudinal direction of the claw, is one of a half ellipse and a rectangular shape.

4. Claw toothing according to claim 1, wherein a part of the claws of a partner of the claw toothing is higher than the remaining claws.

5. Claw toothing according to claim 4, wherein each second claw is higher.

6. Claw toothing according to claim 4, wherein a height of the roof profile corresponds at least partly to the extent of superelevation.

7. Claw toothing according to claim 1, wherein a surrounding height section, forming a bottom edge of the roof profile, is flattening.

8. Claw toothing according to claim 3, wherein the roof profile includes lateral rounding.

* * * * *